United States Patent [19]

Wulker et al.

[11] 4,053,265
[45] Oct. 11, 1977

[54] MOLD FOR RETREADING PNEUMATIC TIRES

[75] Inventors: Jan-Eric Lennart Wulker, Traslovslage; Gote Bertil Sivert Bohman, Varberg, both of Sweden

[73] Assignee: Dacapo AB, Varberg, Sweden

[21] Appl. No.: 752,026

[22] Filed: Dec. 20, 1976

Related U.S. Application Data

[63] Continuation-in-part of Ser. No. 536,775, Dec. 27, 1974, abandoned, which is a continuation-in-part of Ser. No. 465,878, May 1, 1974, Pat. No. 3,983,193.

[30] Foreign Application Priority Data

Nov. 12, 1973 Sweden .................................. 7315263
Apr. 10, 1974 Sweden .................................. 7404835

[51] Int. Cl.² ........................................... B29H 5/04
[52] U.S. Cl. ............................. 425/20; 425/DIG. 44; 425/39; 425/812; 264/36; 156/96; 156/129
[58] Field of Search .............. 425/28 D, 20, 39, 812, 425/DIG. 44, DIG. 47, 19; 264/36

[56] References Cited

U.S. PATENT DOCUMENTS

| 2,014,010 | 9/1935 | Wheatley | 264/36 |
|---|---|---|---|
| 2,337,998 | 12/1943 | Karoff | 425/DIG. 44 |
| 2,421,099 | 5/1947 | Vogt | 264/36 X |
| 2,756,460 | 7/1956 | Heintz | 425/28 D |
| 2,871,541 | 2/1959 | James | 425/DIG. 44 |
| 2,929,124 | 3/1960 | James | 425/DIG. 44 |
| 3,377,662 | 4/1968 | Fukushima | 425/812 X |
| 3,745,084 | 7/1973 | Schelkmann | 425/39 X |
| 3,752,726 | 8/1973 | Barefoot | 425/39 X |
| 3,793,116 | 2/1974 | Schelkmann | 425/19 |

*Primary Examiner*—J. Howard Flint, Jr.
*Attorney, Agent, or Firm*—George W. Price; Walter Lewis

[57] ABSTRACT

A resilient mold and a method for retreading tires using such mold which has an inner face of a normal, unstretched diameter which is smaller than the outer diameter of a tire tread. The mold is in the shape of a ring and has, on its inner side or face, an embossing pattern which applies a tread design to a vulcanizable rubber band previously applied to a tire body. The ring mold is first expanded and then fitted over the tire body and the so-applied vulcanizable band and, thereafter, the ring mold is allowed to contract responsive to its inherent tension. The ring mold, thus fitted over the tread band, is centered on the body while the tire is rotated. This whole unit is then heated to a temperature which converts the tread band into a plastic form and embosses the tread design from the ring mold onto the tread band, which is vulcanized and bonded to the tire body. The air between the mold and the band may be evacuated and the mold may be subjected to external pressure to assist in embossing the mold pattern in the tread band. The mold inner face is shaped so as to confine the tread band between such face and the tire body.

19 Claims, 9 Drawing Figures

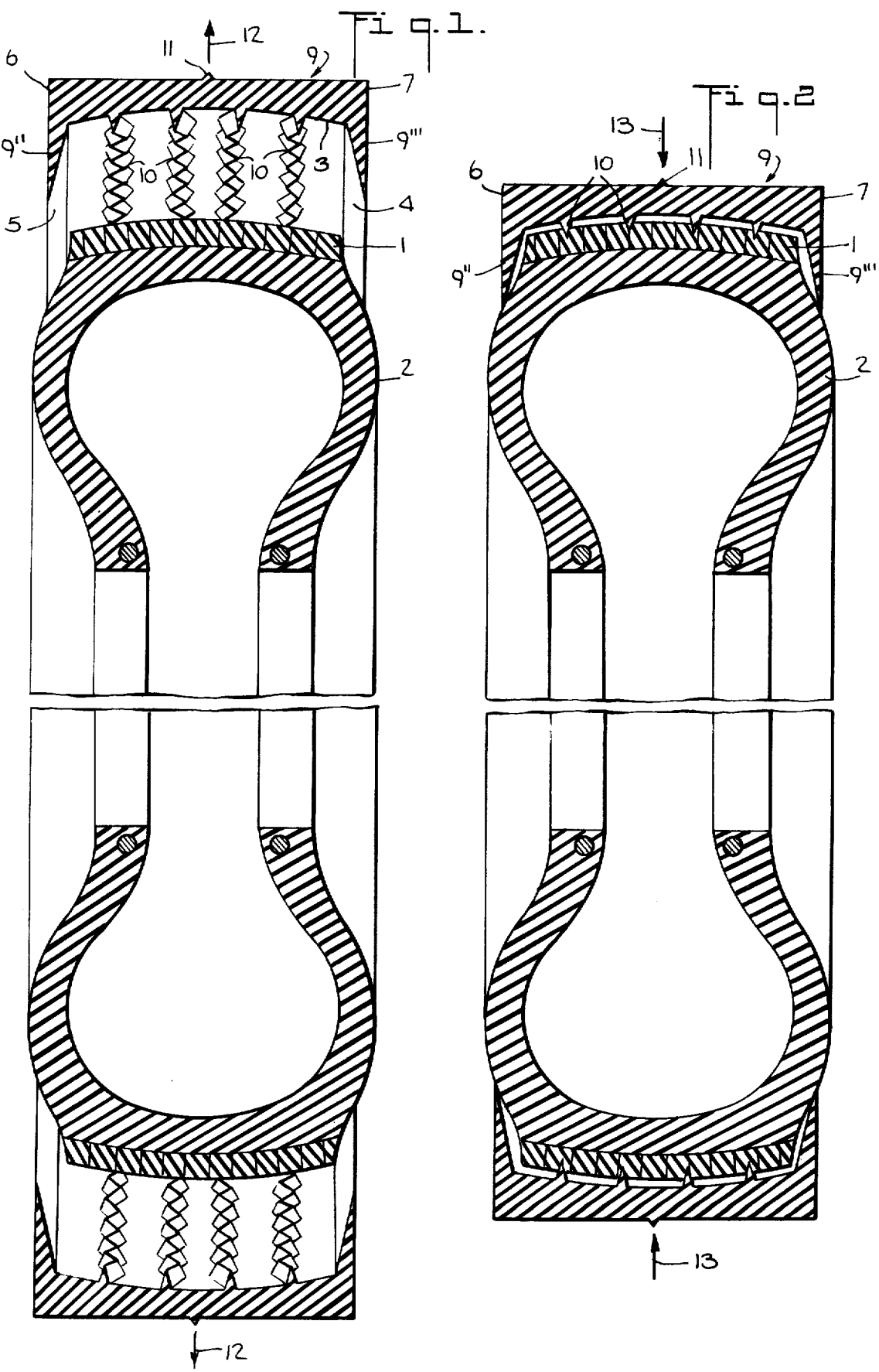

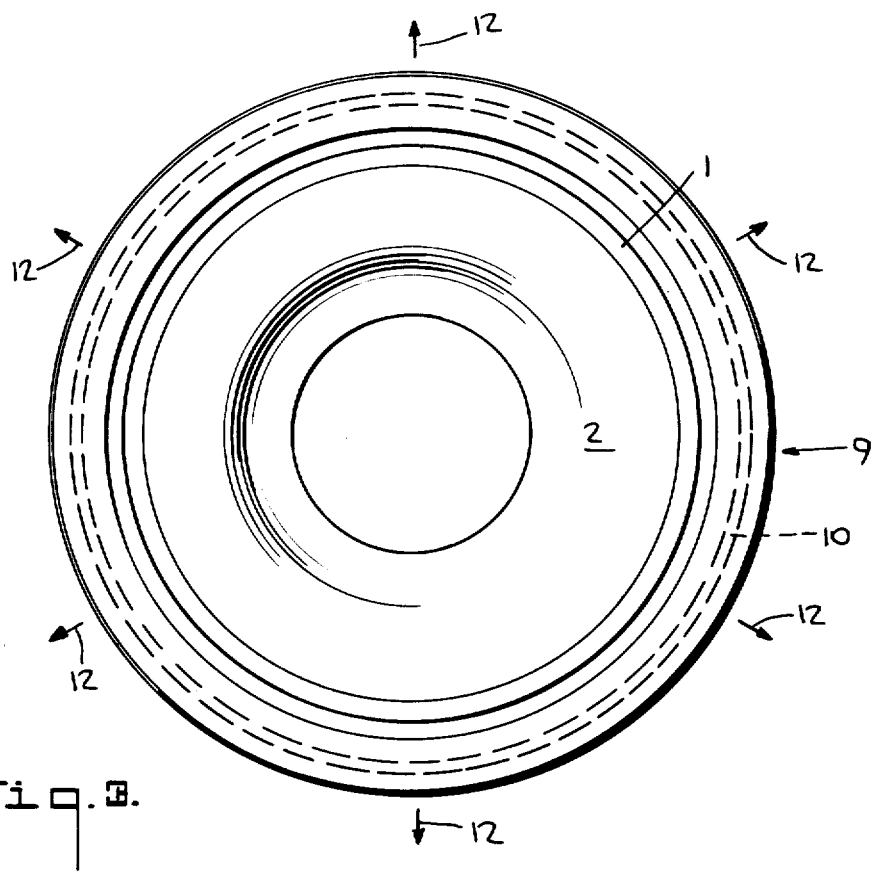
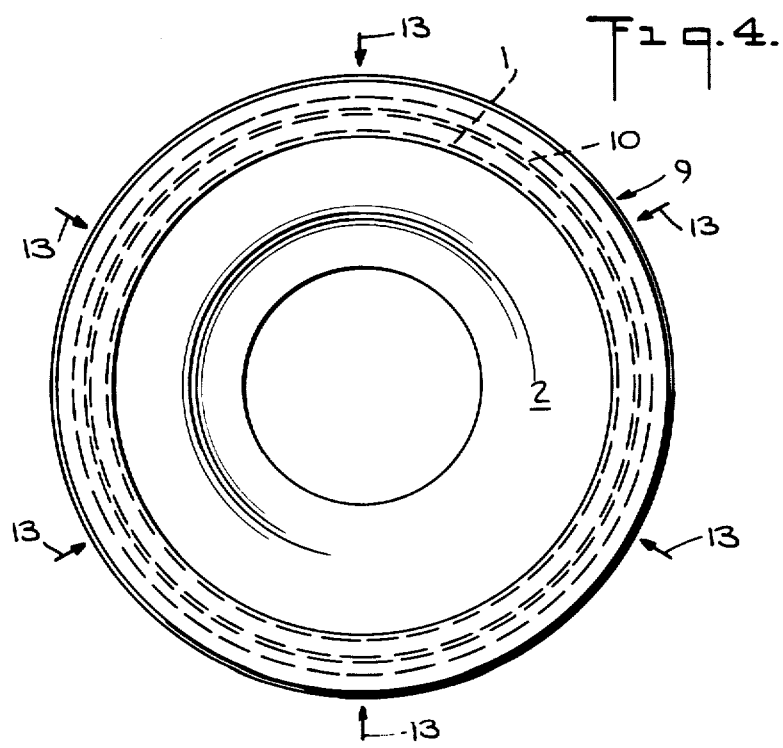

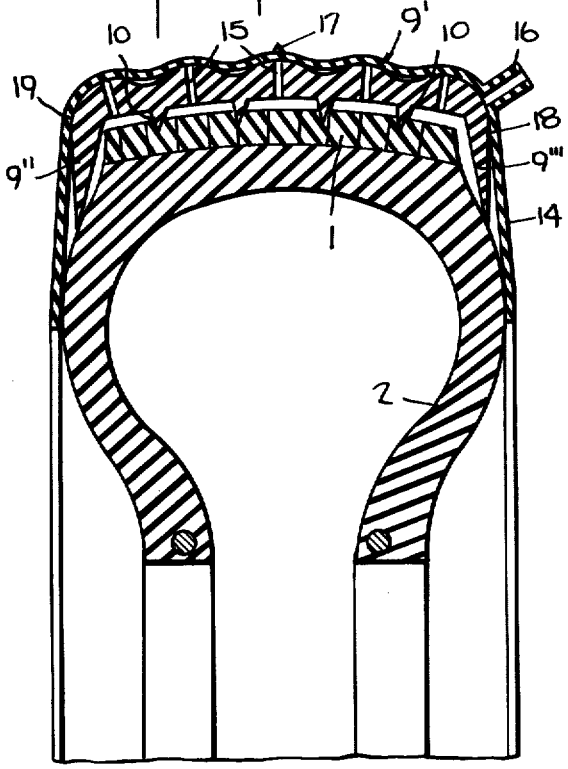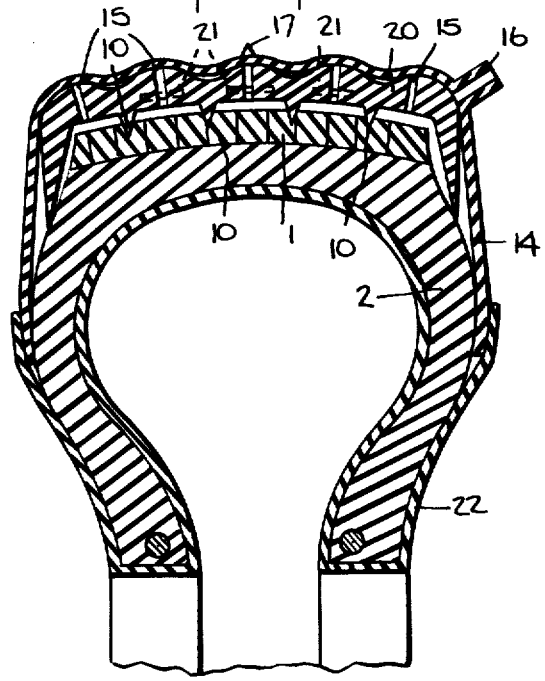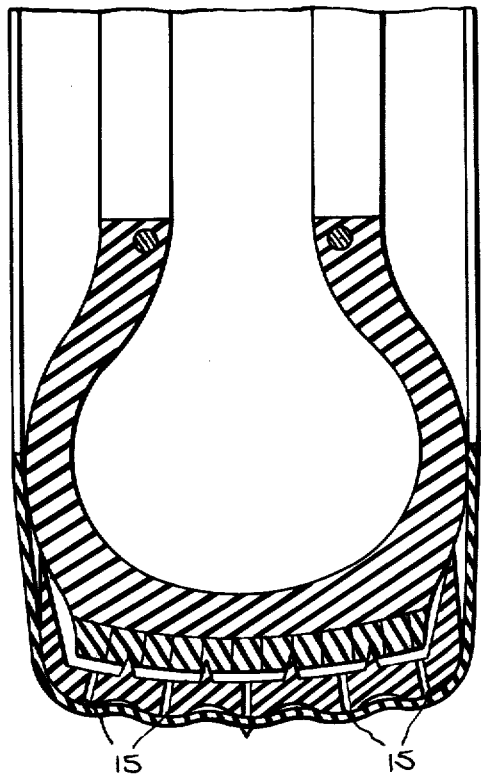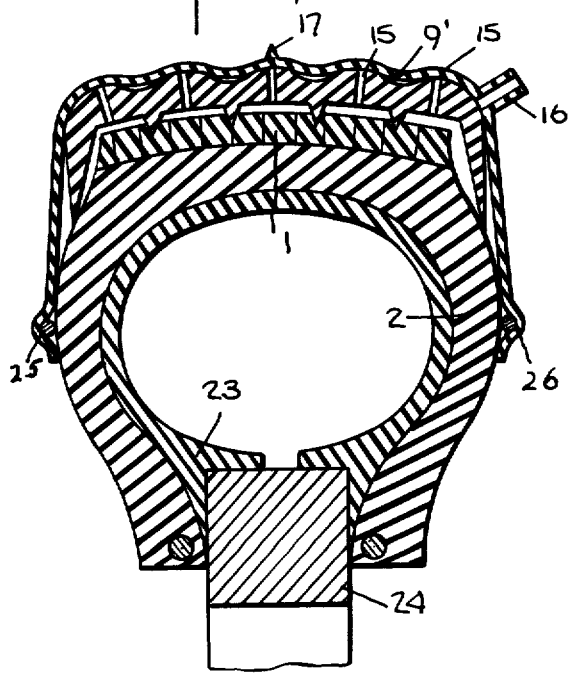

MOLD FOR RETREADING PNEUMATIC TIRES

This application is a continuation-in-part of our co-pending application Ser. No. 536,775, filed Dec. 27, 1974 and entitled "MOLD FOR RETREADING PNEUMATIC TIRES", now abandoned which application is a continuation-in-part of our application Ser. No. 465,878, filed May 1, 1974 and entitled "METHOD OF RETREADING PNEUMATIC TIRES", which has issued as U.S. Pat. No. 3,983,193.

This invention relates to the art of applying rubber treads to tires, are more particularly, to methods of retreading used pneumatic tire bodies with a full circle camelback or tread of new rubber Two systems are often used for retreading tires. One system uses a metal mold to apply a vulcanizable rubber tread band, frequently called a camelback regardless of whether the outer surface thereof is curved or straight in cross-section, to a carcass or a tire body while simultaneously embossing and vulcanizing it. The other system begins with a previously embossed and vulcanized tread band which is bonded to the carcass or tire body in a heated pressure vessel.

The first of these systems uses a rigid, toroidal metal mold or cavity which opens to receive the tire body and then closes to process the retread and design and is shown and described in said U.S. Pat. No. 3,983,193. If the tire body is very carefully placed in a perfect position within the mold, there are no problems. However, if the tire body is not properly placed, the retread will be asymmetrical. Accordingly, the existing system for embossing and vulcanizing retread camelbacks in rigid metal molds entails a risk of deformation of the tire.

After the mold is closed, the tire body usually is subjected to internal pressure during vulcanization. If the internal size of the mold is the same as the unstretched size of the final tire there usually is little stretching of the tire body, but many different molds are required to permit retreading of the many different tire sizes. The internal size of the mold can be such that it may be used for a few different tire body diameters, thereby reducing the number of mold required, but for smaller body diameters the material of the tire is exposed to a substantial stress through pressure and extension during vulcanization in the rigid mold. Furthermore, the newer radial tires are substantially inextensible in the radial direction and, therefore, a different mold for each tire size is almost always necessary to provide the desired retreading. Accordingly, when using this system, it is necessary to have a great number of molds to accomodate different tire diameters.

The second of the systems mentioned above, in a first step, uses hydraulic presses with flat metallic molds to vulcanize the tread band and then in a second step uses a heated pressure vessel to bond, by means of a vulcanizable rubber interlayer or an adhesive, the prevulcanized tread band to the tire body. This system eliminates the deformation of the tire; however, it also great increases the working operations. The tread band has to be prevulcanized and embossed in special vulcanizers. Thereafter, the engagement surfaces of the tire body and the tread band must be suitably cleaned, roughened, and coated with a rubber adhesive and a vulcanizable rubber interlayer which bonds the tread band to the tire body. This method also has the disadvantage that the retreaded tires have different outside diameters. The thickness of the tread band is the same, but the initial tire body diameter varies, dependent on make and the number of ply or cord layers. If two tires with different diameters are used on the same vehicle, treads tend to wear unequally and rapidly.

A further system employing a rubber mold which is substantially inextensible is proposed in U.S. Pat. No. 2,421,099, but as far as applicants are aware such system has not been commercially successful. The use of such a mold has most of the disadvantages of the first system described hereinbefore, and in particular, the use thereof is unsuitable for the newer radial tires which not only are difficult to compress to the extent required to insert them into the mold, but also may be damaged by such compression. In addition, radial tires are substantially inextensible and cannot be expanded without damage to the extent required to produce the desired tread pattern impression with such a mold.

Accordingly, an object of the present invention is to provide new and improved mold for use in tire retreading methods.

Another object is to eliminate expensive and rigid molds heretofore used for retreading tires.

Yet another object is to save costs by eliminating many operations which were heretofore necessary for retreading tires with prevulcanized tread bands such as the use of presses, grinding and trimming machines.

A further object is to provide an inexpensive resilient mold for retreading tires which may be used for retreading tire bodies which have different sizes within a relatively wide range and which do not require radial extension of the bodies during retreading.

In keeping with an aspect of the invention, these and other objects are accomplished by providing an elastic mold which may be stretched over an unvulcanized camelback tire band previously attached to a tire body. The elastic band may be centered on the tire body while it is turning. Then, the entire unit (elastic mold, camelback and tire body) may be heat treated to vulcanize the camelback and to permit the mold to contract and emboss the tread design thereon.

Reference may be made to the following specification and the accompanying drawings describing and showing preferred embodiments of the invention, wherein:

FIG. 1 is a transverse, axial, cross-sectional view of an elastic mold constructed according to the invention and showing the mold as being stretched around a tire body with the tread rubber thereon;

FIG. 2 is a cross-sectional view similar to FIG. 1 showing the elastic mold in its contracted molding position;

FIG. 3 is a schematic, axial view of the stretched elastic mold and the tire body shown in FIG. 1;

FIG. 4 is a view similar to FIG. 3 of the contracted elastic mold and the tire body shown in FIG. 2;

FIG. 6 is a cross-sectional view similar to FIG. 2 showing the elastic mold and the tire body with a superimposed rubber diaphragm;

FIG. 7 is a fragmentary, cross-sectional view, similar to FIG. 6, of a modified embodiment of the invention in which the mold contains re-enforcing wires and in which an internal bladder is used during vulcanizing;

Figure 5:
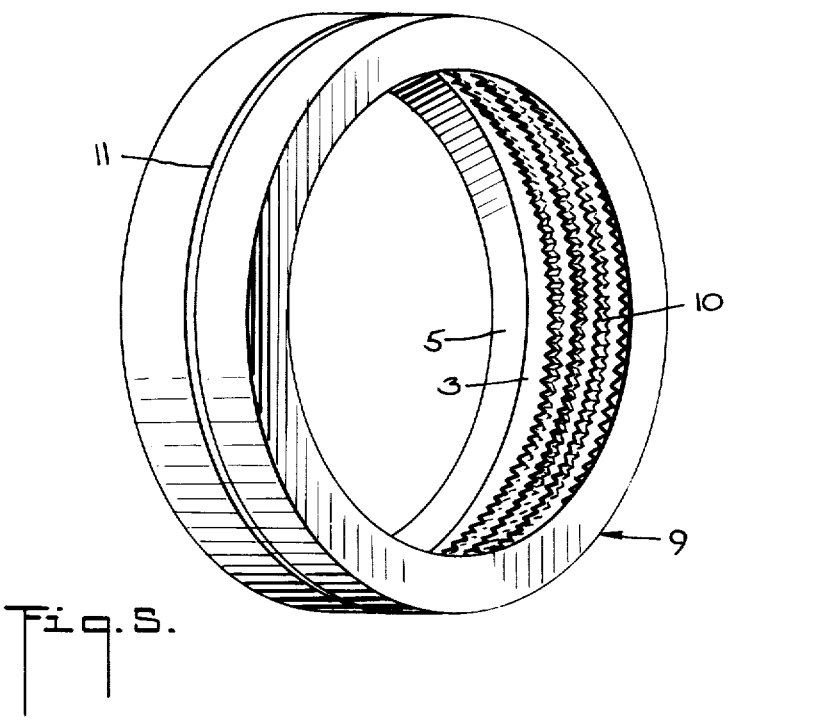
FIG. 5 is a perspective view of the elastic mold.
Figure 9:
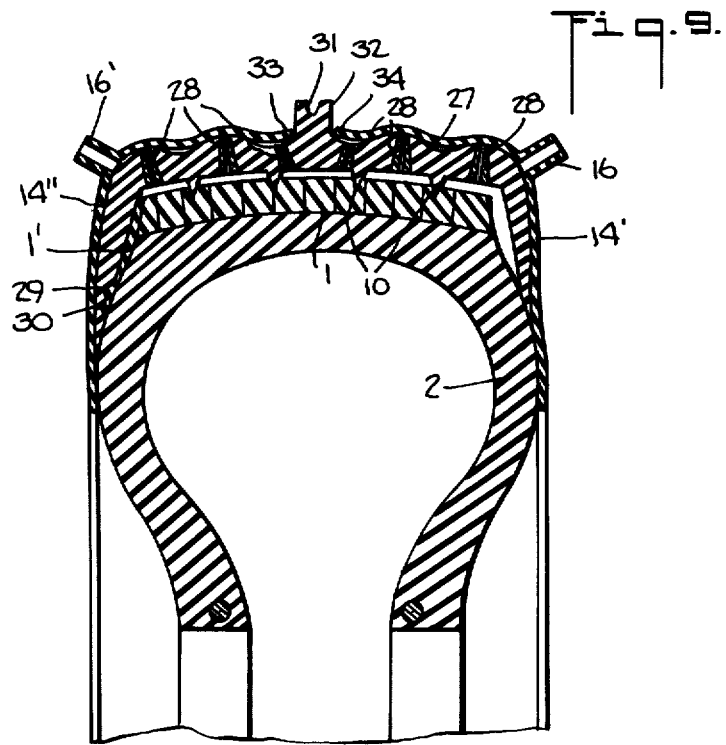

FIG. 8 is a fragmentary, cross-sectional view, similar to FIG. 7, of a modified embodiment of the invention in which a sealing ring and a tube-like bladder are used during vulcanizing; and FIG. 9 is a fragmentary, cross-sectional view, similar to FIG. 7, of a modified embodiment of the invention in which the air removal holes in the mold are formed by hollow metal pins, one of the mold lips has rib forming recesses, and a centering groove is provided.

In accordance with a preferred embodiment of the invention, as illustrated in FIGS. 1-4, a tire body 2 which is to be retreaded is first treated on its radially outward surface, in a conventional manner, such as by grinding, etc., to provide a tread rubber receiving surface. A tread layer or band 1 of unvulcanized rubber, without the tread pattern thereon, is then placed around the tire body 2 in contact with such prepared surface, such as by winding one or more ribbons of such rubber therearound, forming a band of rubber of the proper size and placing it therearound, etc. The thickness of the band 1 is selected relative to the diameter of the tire body 2 so that the outside diameter of the retreaded tire will be uniform and standard and the thickness of the tread rubber band 1 varies according to the practice of the retreader. Thus, some retreaders prefer a thinner band 1 in the belief that there is lower heat build-up in the tire when it is used on a vehicle, whereas other retreaders prefer thicker bands. In general, however, the thickness of the band 1 is in the range from 12 to 26 thirty-seconds of an inch with tire sizes having an inside diameter from 13 inches to 24.5 inches, or a corresponding outside diameter from about 40 inches to 44 inches. The thickness may be up to 5 inches for larger tires. The corresponding dimensions at the outsides of the sidewalls may range from 5 to 11 inches.

Thereafter, an elastic mold or embossing ring 9 having tread pattern projections 10 on its inner side or face 3 and preferably treated on its inner face 3 with an anti-adhesive agent, is stretched radially, as indicated by the arrows 12, and placed around the tire body 2 and tread band 1 as shown in FIG. 1 and is then released permitting the mold 9 to contract, as indicated by the arrows 13, and assume the position shown in FIG. 2, i.e., with the projections 10 engaging the tread band 1 and usually, penetrating partly into the band 1. The mold or ring 9 must be sufficiently resilient in an outwardly radial direction to permit it to be stretched around the tread band 1, and it must withstand the vulcanizing heat subsequently applied without deforming. Therefore, a suitable high temperature elastic rubber or similar material is used to make the ring mold 9. In one embodiment actually used, the vulcanizing temperature of the rubber of the band 1 was about 100° C and the rubber of the mold or ring 9 vulcanized at about 150°-180° C., and was otherwise resistant to heat. As used herein, "vulcanizing temperature" means a temperature at which the rubber compound will substantially completely cure within a reasonable time and will not change its physical properties or deteriorate significantly when it is heated up to such temperature after it has been so cured.

The projections 10 on the inner face 3 of the mold 9 form an embossing tread pattern, that is, they form grooves, etc. in the tread band 1 and the pattern may be any selected pattern. The mold 9 also has a pair of radially inwardly extending lips 9″ and 9‴ at axially opposite edges 6 and 7 thereof for purposes hereinafter described. When expanded or stretched (FIGS. 1 and 3), the smallest inner diameter of the mold 9 is larger than the outer diameter of the vulcanizable tread band 1 on the tire body 2. On its outer side, equatorial to the tread, the mold 9 has a full-circle projection bead or circumferential fin 11, which serves as a centering index when the ring is placed over the tire body 2 and tread band 1, just before the vulcanization step. Preferably, the tire is rotated, on any suitable supporting mechanism (not shown) while the bead or fin 11 is inspected or measured for trueness of its position. Although the unvulcanized rubber of the tread band 1 may be relatively stiff, it is formable and during the centering of the mold 9 with the aid of the fin 11, the mold 9 continues to contract, responsive to its own inherent tension. In any event, it is contracted to the extent permitted by the tread band 1 by the time that the centering steps are completed. Thus, the mold 9 presses radially inwardly, in the direction of the arrows 13, against the unvulcanized tread band 1 and the tire body 2.

The unit comprising the tire body 2, the rubber camelback layer 1 and the ring mold 9 is thereafter placed in a heated tank, using either gas or liquid as a heat transfer medium. In the hereinbefore cited example of camelback rubber which vulcanizes at a low temperature, such as 100° C., the heated tank temperature will usually be about 100° C - 150° C. Preferably, the tire body 2 with the layer 1 and the mold 9 thereon are heated so that the layer 1 is hotter than the mold 9 so as to avoid folding over the projections 10, e.g., by initially supplying heat only interiorly of the tire body 2 and permitting the body 2 and the layer 1 to become hotter than the mold 9 prior to applying final curing temperatures and pressures in a conventional manner.

While so heated, the rubber layer 1 is changed from a low plastic condition into a highly plastic condition. In this highly plastic state during the vulcanization process, the inherent tension of the ring mold 9 causes it to press against the layer 1 and transfers and embosses the profile of its tread pattern projections 10 into the rubber layer 1. The elastic pressure of the ring mold 9 is directed radially toward the tread area of the enclosed tire body to accomplish the corresponding embossing process. Preferably, the plastic condition of the rubber camelback layer 1 is maintained, as long as possible, through a slow temperature increase of suitably selected rubber mixtures, so that the embossing pressure exerted by the ring mold 9 will not have to be high, and so that the profiles of the projections 10 on the inner face of the ring mold which are deformable under pressure, are not deformed. Also, suitable holes, similar to those described hereinafter, may be formed in the ring mold 9 to enable an escape of air entrapped between the inner face of the mold 9 and the tire body 2.

The embossing part of the retread operation is concluded during the early part of the vulcanization process. Later, because of the vulcanization, the rubber layer 1 changes from its plastic condition to a stable elastic condition. After the completion of the vulcanization process, the pattern of the tread has become stable and finished. The ring mold 9 is then stretched and removed from the tire, which is now retreaded, and such ring mold 9 is ready for re-use in the retreading of another tire body.

It has been found that in order to provide a practical mold 9, that is, a mold 9 which may be re-used many times, which has sufficient elasticity for stretching without breaking over customary tire sizes and tread layer 1 thicknesses, which applies sufficient radial forces to the layer 1, which can be centered on the layer 1 without distortion of the tread pattern, etc., the rubber of the mold 9 preferably should have the following properties:

A. Resistant to damage up to 200° C.

B. Substantially unaffected by sulphur migration to prevent it from becoming hard with repeated use.

C. A hardness of 80 Shore at room temperature and a hardness greater than that of the rubber layer 1 at the vulcanization temperature of the latter.

D. Slow rebound properties up to about 70° C. to allow time for proper and accurate centering of the mold 9 before it returns to its normal dimensions.

E. Fast rebound properties at temperatures above 70° C.

F. Small permanent set with compression.

G. Low affinity for the rubber of the layer 1 to minimize parting forces.

The preferred characteristics for the mold 9 may be generally stated as follows:

1. The elastomer from which it is made has a vulcanization temperature which is at least 20% higher than that of the rubber for the band 1 to provide longer mold life;

2. The hardness and stiffness of the projections 10 and the elasticity of the mold 9 is such as to permit the embossing of small or thin tread grooves;

3. The heat conductivity of the elastomer should be as high as possible to aid in distributing the vulcanizing heat and known types of additives may be used to increase the heat conductivity thereof;

4. The stretchability and resiliency should be such that it can be stretched from a normal diameter, approximately the outer diameter of the tire body 2, to a diameter greater than the outer diameter of the unvulcanized tread band 1 on the tire body 2, and thereafter, contract to such normal diameter and to normal dimensions without damage, such as tears or cracks, and such stretching and contracting should be repeatable many times;

5. The mold should be stretchable as set forth in (4) to a diameter at least 1¼ inches greater in diameter than the outer diameter of the layer 1 to be embossed and accept tire sidewall widths varying from minus ¼ inch to plus ⅜ inch from standard.

6. If the tread pattern embossing pressure is to be supplied only by the inherent contracting forces of the mold 9, it should be relatively thick in cross-section (see FIG. 1), whereas with the application of external pressure, as described hereinafter, the cross-section may be relatively thin (see FIG. 6);

7. The normal diameter of the mold 9 should be such that the inside thereof is completely filled by the rubber of the band 1 and the projections 10 are fully seated before the mold 9 is fully contracted and hence, while it is still applying pressure to the band 1. However, the normal diameter should not be small enough to apply a pressure which forces rubber of the band 1 from under the mold 9, at the lips 9″ and 9‴, during the vulcanization step;

8. If it is desired to use the mold 9 for making retreaded tires of different diameters, the stretchability should be such as to permit the mold 9 to be stretched over the largest diameter tire body and tread band to be processed and yet should have a normal diameter and hence, resilience, as set forth in Paragraph (7) hereinbefore.

It has also been found that to provide a satisfactory mold 9, it must have the following minimum values of the properties set forth below and, generally speaking, the properties will not exceed, but may exceed, the maximum values set forth below:

| Room Temperature Property-ASTM | Required Min. Value | Usual Max. Value |
|---|---|---|
| Tensile strength at break | 500 p.s.i. | 3,000 p.s.i. |
| Elongation at break | 20% | 500% |
| Modulus at 300% elongation | 100 p.s.i. | 2,000 p.s.i. |
| Hot tear | 100 p.s.i. | 1,200 p.s.i. |
| Shore A hardness | 50 | 90 |

In addition, the rebound properties, as determined by the well-known Lupke test method, must be in the range of 15-30 at temperatures up to about 70° C., and the compression set should not exceed 40% and, preferably, is no greater than 5%.

It is within the knowledge of those skilled in the art to compound rubbers for making the mold 9 which will provide the properties set forth hereinbefore. Such rubbers may be made from commercially available elastomers and materials, and a specific example of one such rubber is as follows:

| Material | Manufacturer or Source | Manufacturing or Commercial Designation | Parts by Volume |
|---|---|---|---|
| Polyacrylate rubber | B.F. Goodrich, Cleveland, Ohio | Hycar - 4041 | 100 |
| High structure, high abrasion furnace black | Commercially available | N-339 | 65 |
| Waxy hydrocarbon | Witco Chemical Co., Los Angeles, Calif. | Sunolite 240 | 1.5 |
| Trimethyldihydroquinoline | R.T.Vanderbilt Co. Los Angeles, Calif. | Age Rite Resin D | 3 |
| Cumarone indine | Neville Chemical Co. Los Angeles, Calif. | Cumar-R-17 | 14 |
| Stearic acid | Commercially available | Stearic Acid Flake | 1 |
| Processing Aid | Technical Processing, Inc., Patterson, N.J. | TE-58A | 1.75 |
| Potassium stearate | Commercially available | — | 3 |
| Sulfur | Commercially available | Rubber Grade | 0.3 |

The TE-58A material is only a processing aid and may be omitted

With respect to the hardness and stiffness of the projections 10 mentioned in Paragraph (2) hereinbefore, it is preferred that the mold 9 be unitary and of the same material throughout, in order to simplify its manufacture and reduce its cost. However, if desired, the mold 9 can be made of different materials at different parts as long as the desired stretchability, resilient, re-usability, etc., are retained. For example, the projections 10, or some of them, may be circumferentially discontinuous and may be formed of a relative stiff and hard rubber or may be metal inserts in the rubber body of the mold 9.

It will be observed from the drawings that the axially opposite edges 6 and 7 of the mold 9 have a pair of radially inwardly extending, circumferentially continuous, lips 9" and 9"' which extend from the surface 3 by a distance greater than the radial dimension of the projections 10. As mentioned hereinbefore, the unvulcanized rubber tread band 1 becomes relatively soft and plastic during the vulcanizing step, and the main purpose of the lips 9" and 9"' is to confine the rubber of the band 1 at its sides during such vulcanizing step. The lips 9" and 9"' also aid in centering the mold 9 with respect to the tire body 2, the lips 9" and 9"' having a radial dimension such that they engage the tire body 2 at least when the mold 9 has fully contracted. Preferably, the radial dimension of the lips 9" and 9"' from the surface 3 is slightly greater than the radial dimension of the projections 10 plus the radial dimension of the band 1 so that the lips 9" and 9"' engage the tire body before the mold is fully contracted, and the inner faces 4 and 5 thereof are divergent, as shown, so as to increase the pressure of the lips 9" and 9"' against the tire body 2 as the mold 9 contracts and so as to provide tapered sides for the band 1. Preferably, also, the minimum distance between the lips 9" and 9"', i.e., the points of intersection thereof with the inner face 3, is less than the width of the prepared surface of the tire body 2 to which the band 1 is to be applied and radially innermost portions of the faces 4 and 5 are spaced apart by a distance greater than such width to assist in centering of the mold 9 with respect to the tire body 2. The lips 9" and 9"' are substantially continuous and, preferably, the lips 9" and 9"' are circumferentially continuous as illustrated, but, if desired, each lip may be formed by a plurality of circumferential segments which are closely spaced, contacting or overlapping at the segments ends when the mold is in its contracted state. Although the inner faces 4 and 5 have been shown as smooth, they may have tread pattern projections thereon. Also, although it is preferred that the lips 9" and 9"' be integral with the mold 9, the lips 9" and 9"' may be separate rings of an inner diameter which will cause them to engage the sidewalls of the tire body 2 and of an outer diameter which will cause them to engage the body of the mold 9 when it is fully contracted but without preventing such contraction.

Accordingly, the preferred embodiment of the mold 9 of the invention is made of a resilient and stretchable elastomeric material and is in the shape of a generally circular, continuous band having an inner face 3 extending around and facing the axis of the band and a pair of axially opposite edges 6 and 7. The band has integral therewith a pair of substantially circumferentially continuous axially spaced lips 9" and 9"' at the edges 6 and 7 and extending from said face 3 toward said axis and has a plurality of spaced tread pattern projections 10 on said inner face 3 intermediate said lips 9" and 9"' and extending toward said axis. When the mold 9 is unstretched, the inner diameters of the face 3 and the projections 10 are less than the outer diameter of the tread band 1 and the inner diameter of the lips 9" and 9"' is less than the inner diameter of said tread band 1. The projections 10 have a radial dimension from the face 3 less than the radial dimension of the tread band 1, and the mold 9 is stretchable to a size such that the inner diameter of at least one of the lips 9" and 9"', and hence, of the projections 10, is at least equal to the outer diameter of the tread band 1.

In one method of making the ring mold 9, a new or unused retread tire can be used as a form. First, a layer of any suitable high temperature, vulcanizable rubber of the desired thickness is placed over the patterned tread surface of the new or unused tire form, which, preferably, is pretreated with an anti-adhesive agent. Thereafter, this layer, while on the form, if vulcanized under both pressure and suitable high temperature. Thus, the resilient rubber layer is internally embossed with a negative contour of the tread pattern on the tire which is used as a form and may be used as the mold 9. The best results of creating said negative contour are obtained when the tire with the unvulcanized rubber layer thereon is inserted into a flexible tubular rubber envelope which covers the tire on its entire surface. The air from the open space between the tire body, rubber layer and tubular envelope is evacuated by suction and the assembly is exposed to heat and pressure in a chamber. Preferably, a tubular envelope as is described in U.S. Pat. No. 2,966,936 is used for manufacturing the ring mold 9. Other methods of using envelopes as known from the art of retreading may be utilized as well.

Any air entrapped between the rubber layer and the form tire is evacuated through radially extending holes which are made in the body of the tire at the deepest parts of the tread pattern. These holes are similar to the holes 15 shown in FIG. 6 except that they extend through the body of the tire form instead of through the mold 9'.

When required, the embossing pressure of the ring mold 9 may be augmented by any suitable means for applying additional pressures, which are directed radially against the mold 9.

Preferably, pressure of a fluid or gaseous vulcanizing medium is used in connection with a superimposed rubber diaphragm to apply an auxiliary embossing pressure to the assembly. FIG. 6 shows how this method is carried out in practice. The tire body 2 with an unvulcanized rubber band or layer 1 and matrix ring or ring mold 9' is covered with a resilient rubber diaphragm 14. This diaphragm 14 also covers, with sealing, a surface portion of the tire body 2 which extends beyond the lips 9" and 9"' of the ring mold 9'.

The ring mold 9' is provided with radially extending holes 15 and the rubber diaphragm 14 is provided with a suction valve 16. By means of a suction pump (not shown), connected to this valve 16, entrapped air can be evacuated from the spaces between the inner side of the ring mold 9' and the outer side of the tread band 1 and between the outer side of the ring mold 9' and the inner side of the rubber diaphragm 14. Those surfaces of the ring mold 9', which are directed radially outwards, can be roughened or suitably patterned to allow the passage of air from the holes 15 to the suction valve 16.

In order to facilitate the application of the ring mold 9' and the rubber diaphragm 14 onto the tire body 2 provided with the tread band 1 and to have the first two elements positioned in controlled relation to each other, they are preferably bonded together at-the lateral edges 18 and 19 of the ring mold 9'. The rubber diaphragm 14 thereby will accompany the ring mold 9' when this is expanded and contracted.

In order to assist, in this case, in the centering of the matrix pattern projections 10 in relation to the tire body 2, the rubber diaphragm 14 and not, as before, the ring mold 9, is provided with a full-circle projection bead or circumferential fin 17.

The entire assembly including the tire body 2 with the tread band 1, the ring mold 9' and the rubber diaphragm 14 is introduced into a conventional pressure vessel (not shown), to which a heated fluid or gaseous vulcanizing medium is then supplied under proper pressure, thereby applying pressure to the rubber diaphragm 14 and thus, onto the ring mold 9', such pressure being in addition to the contracting forces of the mold 9'. During this vulcanizing process, the pressure is increased slowly.

In order to achieve a true print of the pattern of projections 10 on the rubber band or layer 1, when using such an additional pressure, the ring mold 9' should be designed as is shown in FIG. 6. As shown therein, the thickness of the ring mold 9', seen transversely, varies such that it is largest in the middle between two neighboring projections 10 of the pattern and is decreased from the middle in both directions towards these projections 10. Such a shape eliminates the risks that the shape of the tread band 1 of the vulcanized tire will be concave between these two projections, the additional thickness preventing bulging of the mold 9' intermediate the rows of projections 10. Thus, through the design mentioned hereinbefore, the resistance to bending will be the largest in the middle between the rows of projections 10, where the largest bending moment is generated by the additional pressure. The bending of the mold 9' between the rows of projections 10 thereby will be minimized, which is essential for a true tread print.

When using an additional pressure as is described in connection with FIG. 6, it is possible to dimension the ring mold 9' to be thinner, as it is not necessary for the ring mold 9' to have such a large inherent tension. The air entrapped between the tire band 1 and the ring mold 9' is evacuated to insure a good duplication or printing of the tread design. If the entrapped air were allowed to remain, it would be compressed to deface the tread and thereby result in an unsatisfactory imprinting of it into the embossed tire band 1.

The embodiment of the invention shown in FIG. 7 is similar to the embodiment in FIG. 6, except that the mold 20 corresponding to the mold 9' has a plurality of circumferentially spaced, axially extending rods or pins 21 therein and the interior of the body 2 is covered by an internal diaphragm 22. The pins 21, which are relatively rigid, aid in preventing bending of the mold 20, intermediate the rows of projections 10 for the purposes described hereinbefore.

It sometimes happens that a tire body 2 to be retreaded has holes extending from the interior thereof to the surface thereof to which the tread band is applied due to nail punctures, etc. Such holes may make it difficult to remove air by way of the suction valve 16 and, in addition, steam is often used as the vulcanizing heat medium. In the latter case, water can seep through such holes into contact with the underside of the tread band 1 creating voids between the tread band 1 and the tire body 2. For these reasons, it may be desirable to employ an internal, fluid-impermeable diaphragm 22 which covers the interior of the body 2 and extends around the outside thereof and into contact with the diaphragm 14 during the removal of air by way of the valve 16 and the vulcanization of the tread band 1.

FIG. 8 shows an embodiment similar to the embodiments in FIGS. 6 and 7, except that in FIG. 8 the internal diaphragm 22 is replaced by an inflatable bladder 23 supported internally by a ring 24, such bladder 23 and ring 24 serving the same purposes as the internal diaphragm 22 and also serving to aid in maintaining the desired shape of the body 2 during vulcanizing. However, the bladder 23 is not employed to increase the diameter of the body 2 as is the case in prior art systems in which the body 2 must be stretched to produce embossing. FIG. 8 also shows a pair of O-rings 25 and 26, which may be of vulcanized or unvulcanized rubber, between the diaphragm 14 and the sidewalls of the body 2 to assist in providing a fluid seal between the diaphragm 14 and the body 2.

FIG. 9 shows an embodiment similar to the embodiments in FIGS. 6-8, except that the mold 27 has been modified to include hollow metal pegs or pins 28, rib forming recesses 29 and 30, and a centering groove 31. The metal pins 28, which are embedded in the mold 27, provide the holes 15 described and may be incorporated in the mold 27 during vulcanization thereof or inserted therein after vulcanization thereof.

The groove 31 in the rib 32 integral with the mold 27 may be used in centering the mold 27 with respect to the body 2. Thus, a roller (not shown) properly mounted with respect to a rotatable support for the body 2 may ride in the groove 31 as the body 2 is rotated, causing the rib 31, and hence, the mold 27, to center properly with respect to the body 2.

Because of the presence of the rib 32, the diaphragm 14 may be made in two parts 14' and 14'', sealed in any desired manner at their edges 33 and 34 to the mold 27 and connected to two suction valves 16 and 16'.

In some cases, it is desirable for decorative purposes to apply one or more ribs to the sidewall, or to both sidewalls of a tire body 2 being retreaded. In such cases, a lip, such as the lip 27', or both lips, may be provided with the necessary number of circumferential recesses, such as the recesses 29 and 30, for receiving and forming unvulcanized rubber 1' extending from the tread band 1 downwardly to the recesses 29 and 30 or merely applied to the portion of sidewall of the body 2 adjacent to the recesses 29 and 30, the thickness of the rubber 1' being sufficient to at least fill such recesses 29 and 30. Such rubber 1' will assist in sealing the diaphragm part 14' to the sidewall during air removal and vulcanizing of the tread band 1.

Those skilled in the art will readily perceive modifications which fall within the scope and the spirit of the invention. Therefore, the appended claims are to be construed broadly enough to cover all equivalent structures.

We claim:

1. A resilient, stretchable mold for embossing a pattern in a layer of unvulcanized rubber on the peripheral surface of a supporting body, said mold being made of an elastomeric material and having the shape of a generally circular, continuous band having an inner face extending around and facing the axis of said band, said inner face having a normal diameter when said mold is in its unstretched condition, said band having a plurality of spaced, pattern forming projections of a dimension in the radial direction extending from said inner face toward said axis and said band having a pair of axially spaced lips, one on one side and the other on the other side of said projections, extending toward said axis and inwardly of said inner face, said lips being substantially continuous in a direction circumferentially of said axis, the normal diameter between the innermost extents of said projections when said mold is in said unstretched condition thereby being less than said normal diameter of said inner face and said band being stretchable to a size such that the diameter between said innermost extents of said projections is at least equal to said normal diameter of said inner face, the elasticity of said elastomeric material being sufficient to permit stretching of said band to said size without exceeding the elastic limit thereof and said elastomeric material of said mold having a tensile strength at break of at least 500 p.s.i., an elongation at break at least 20 percent, a modulus at 300 percent elongation of at least 100 p.s.i., a hot tear strength of at least 100 p.s.i., a Shore hardness of at least 50, a compression set not exceeding 40 percent and a Lupke rebound in the range from 15 to 30 at temperatures up to about 70° C.

2. A mold as set forth in claim 1, wherein said tensile strength is in the range from 500 to 3000 p.s.i., said elongation is in the range from 20 percent to 500 percent, said modulus is in the range from 100 to 2000 p.s.i., said hot tear strength is in the range from 100 to 1200 p.s.i. and said Shore hardness is in the range from 50 to 90.

3. A mold as set forth in claim 2, wherein said compression set does not exceed 5 percent.

4. A mold as set forth in claim 1, wherein said band also has an outer face extending around and facing away from said axis and has a plurality of holes extending from said inner face at portions thereof intermediate said projections to said outer face to permit the passage of air from said inner face to said outer face.

5. A mold as set forth in claim 4, further comprising a fluid impenetrable diaphragm extending over said outer face and alongside said lips, said diaphragm being adhesively secured to said band at axially opposite edge portions thereof and circumferentially of the latter to provide an air chamber between said diaphragm and said outer face of said band for removing air from between said band and said layer through said holes, and a valve in said diaphragm for withdrawing air from between said diaphragm and said outer face and through said holes.

6. A mold as set forth in claim 1, wherein a plurality of said projections are arranged in a plurality of circumferentially extending, axially spaced rows, wherein said inner face between said rows and in cross-section is substantially flat and wherein the radial thickness of said band between said rows is greater than the thickness of said band radially outward of said rows.

7. A mold as set forth in claim 1, wherein a plurality of said projections are arranged in a plurality of circumferentially extending, axially spaced rows, wherein said inner face between said rows and in cross-section is substantially flat and further comprising a plurality of axially extending, circumferentially and axially discontinuous re-enforcing means in said band radially outwardly of the spaces intermediate said rows but interrupted outwardly of said rows, and said re-enforcing means being spaced outwardly of said inner face and being relatively rigid as compared to the elastomeric material of said band to reduce bending of said band intermediate said rows.

8. A mold as set forth in claim 1, wherein at least one of said lips has an inner surface facing the other of said lips and wherein said inner surface of said one lip has a circumferentially extending, rib-forming recess therein.

9. A mold as set forth in claim 1, wherein said lips have a dimension inwardly of said inner face which is greater than said dimensions of said projections.

10. A mold as set forth in claim 1, wherein said normal diameter of said innermost extents of said projections is less than the inner diameter of said layer.

11. A mold as set forth in claim 1 for embossing a tread pattern in a circular layer of unvulcanized tread rubber on the peripheral surface of a circular tire body, said layer having a predetermined outer diameter, a predetermined inner diameter and a predetermined radial thickness, wherein the inner diameter of said inner face and the diameter between the innermost extents of said projections, when said mold is unstretched, are less than said outer diameter of said layer, the inner diameter of said lips, when said mold is unstretched, being less than said inner diameter of said layer, and the radial dimensions of said projections is less than said predetermined radial thickness of said layer.

12. A mold as set forth in claim 1, wherein said tire body is a radially inextensible, radial tire body.

13. In tire retreading apparatus comprising heating means for receiving and heating a circular, radially inextensible, radial tire body having on the peripheral surface thereof a circumferentially continuous layer of uncured rubber which softens on heating, said layer having a thickness selected to provide the tire tread and having a normal outer diameter and said heating means having means for heating said layer to vulcanize said layer, and a mold for producing a tread pattern in said layer, wherein the improvement comprises a mold of elastomeric material for surrounding said rubber layer during the heating thereof and for embossing said tread pattern in said rubber layer without applying stretching forces to said body which increase said diameter of said layer above said normal diameter thereof, said mold being made of an elastomeric material and having the shape of a generally circular, continuous band and having an inner face extending around and facing the axis of said band, said inner face having a normal diameter when said mold is in its unstretched condition which is at least as small as said outer diameter of said layer, said band having a plurality of spaced, tread pattern forming projections of a first dimension in the radial direction extending from said inner face toward said axis and said band having a pair of axially spaced lips, one on one side and the other on the other side of said projections, extending toward said axis and inwardly of said inner face, said lips being substantially continuous in a direction circumferentially of said axis and being of a second dimension in the radial direction from said inner face toward said axis which is greater than said first dimension so as to be adapted to extend along axially opposite sides of said layer, the normal diameter between the innermost extents of said projections when said mold is in said unstretched condition thereby being both less than said normal diameter of said inner face and less than said outer diameter of said layer but said band being stretchable to a size such that the diameter between said innermost extents of said projections is at least equal to said normal diameter of said layer, the elasticity of said band being sufficient to permit stretching of said band to said size without exceeding the elastic limit thereof, and said band after being stretched around said layer and released being adapted to cause said projections to contact said layer before said inner face returns to its normal diameter whereby by reason of the inherent tendency of said band to return to its unstretched condition, said projections have radial forces applied thereto which urge tham against said layer and into said layer during heating and softening thereof and said elastomeric material of said mold having a tensile strength at break of at least 500 p.s.i., an elongation at break of at least 20 percent, a modulus at 300 percent elongation of at least 100 p.s.i., a hot tear strength of at least 100 p.s.i., a Shore hardness of at least 50, a compression set not exceeding 40 percent and a Lupke rebound in the range from 15 to 30 at temperatures up to about 70° C.

14. A mold as set forth in claim 13, wherein said tensile strength is in the range from 500 to 3000 p.s.i., said elongation is in the range from 20 percent to 500 percent, said modulus is in the range from 100 to 2000 p.s.i., said hot tear strength is in the range from 100 to 1200 p.s.i. and said Shore hardness is in the range from 50 to 90.

15. A mold as set forth in claim 13, wherein said first dimension of said projections is less than said thickness of said rubber layer and said normal diameter of said inner face is less than said outer diameter of said rubber layer whereby said band is under elastic tension when said inner face of said band contacts said rubber layer.

16. Tire retreading apparatus as set forth in claim 13, further comprising means for applying pressure to said band directed radially thereof for assisting the pressing of said projections into said rubber layer, said pressure applying means comprising means for supplying fluid under pressure adjacent the outer surface of said band.

17. A mold as set forth in claim 13, wherein a plurality of said projections are arranged in a plurality of circumferentially extending, axially spaced rows, wherein said inner face between said rows and in cross-section is substantially flat and wherein the radial thickness of said band radially outwardly of the spaces between said rows is greater than the thickness of said band radially outward of said rows.

18. Tire retreading apparatus as set forth in claim 13, further comprising a fluid impenetrable diaphragm extending over said outer face of said band and alongside said lips, said diaphragm being adhesively secured to said band at axially opposite edge portions thereof and circumferentially of the latter to provide an air chamber between said diaphragm and said outer face of said band for removing air from between said band and said diaphragm, and a valve in said diaphragm for withdrawing air from between said diaphragm and said band.

19. A mold as set forth in claim 13, wherein a plurality of said projections are arranged in a plurality of circumferentially extending, axially spaced rows, wherein said inner face between said rows and in cross-section is substantially flat and further comprising a plurality of axially extending, circumferentially and axially discontinuous re-enforcing means in said band radially outwardly of the spaces intermediate said rows but interrupted outwardly of said rows, and said re-enforcing means being spaced outwardly of said inner face and being relatively rigid as compared to the elastomeric material of said band to reduce bending of said band intermediate said rows.

* * * * *